United States Patent
Xu et al.

(10) Patent No.: US 10,045,334 B2
(45) Date of Patent: Aug. 7, 2018

(54) REFERENCE SIGNAL DESIGN FOR COVERAGE ENHANCEMENTS

(71) Applicant: QUALCOMM Incorporated, San Diego, CA (US)

(72) Inventors: Hao Xu, San Diego, CA (US); Seyed Ali Akbar Fakoorian, San Diego, CA (US); Brian Clarke Banister, San Diego, CA (US); Peter Gaal, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 15/042,122

(22) Filed: Feb. 11, 2016

(65) Prior Publication Data

US 2016/0242170 A1    Aug. 18, 2016

Related U.S. Application Data

(60) Provisional application No. 62/116,330, filed on Feb. 13, 2015.

(51) Int. Cl.
*H04W 72/04* (2009.01)
*H04W 4/70* (2018.01)
(Continued)

(52) U.S. Cl.
CPC ....... *H04W 72/0413* (2013.01); *H04L 5/0048* (2013.01); *H04W 4/005* (2013.01);
(Continued)

(58) Field of Classification Search
CPC ... H04W 72/0413; H04W 4/005; H04W 8/08; H04W 72/042
See application file for complete search history.

(56) References Cited

U.S. PATENT DOCUMENTS 8,300,608 B2 * 10/2012 Yu .......................... H04W 74/08
                                                     370/329
9,001,946 B2 *  4/2015 Lee ....................... H04B 7/0808
                                                     375/224
(Continued)

FOREIGN PATENT DOCUMENTS

EP         2922225 A1    9/2015
WO    WO-2014077577 A1   5/2014

OTHER PUBLICATIONS

International Search Report and Written Opinion—PCT/US2016/017711—ISA/EPO—dated May 4, 2016.
(Continued)

*Primary Examiner* — Brian D Nguyen
(74) *Attorney, Agent, or Firm* — Patterson & Sheridan, LLP

(57) ABSTRACT

Certain aspects of the present disclosure generally relate to wireless communications, and more specifically to reference signal design for communications with coverage enhancements and devices with limited communications resources, such as machine type communication (MTC) devices, enhanced or evolved MTC (eMTC) devices, and internet of things (IoT) devices. An example method generally includes determining a set of additional reference signals to transmit in a bundled transmission, based on a bundle length of the bundled transmission, and transmitting the bundled transmission, reference signals, and the additional reference signals, based on the determination.

42 Claims, 13 Drawing Sheets

(51) Int. Cl.
*H04L 5/00* (2006.01)
*H04W 4/00* (2018.01)
*H04W 8/08* (2009.01)

(52) U.S. Cl.
CPC ............... *H04W 4/70* (2018.02); *H04W 8/08* (2013.01); *H04W 72/042* (2013.01)

(56) References Cited

U.S. PATENT DOCUMENTS

| | | | | |
|---|---|---|---|---|
| 9,172,509 | B2* | 10/2015 | Zhang | H04L 1/1621 |
| 9,301,255 | B2* | 3/2016 | Takano | H04W 72/044 |
| 9,432,998 | B2* | 8/2016 | Maniatis | H04W 76/068 |
| 9,532,352 | B2* | 12/2016 | Webb | H04L 1/08 |
| 9,674,710 | B2* | 6/2017 | Chen | H04W 16/18 |

OTHER PUBLICATIONS

NEC: "Uplink Reference Signal Enhancement for MTC", 3GPP Draft; R1-150289, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 9-13, 2015 Feb. 8, 2015 (Feb. 8, 2015), XP050933499, Retrieved from the Internet: URL:http://www.3gpp.org/ ftp/ Meetings_3GPP SYNC/RAN1/Docs/ [retrieved on Feb. 8, 2015].
Qualcomm Incorporated: "Physical Data Channels and Associated Physical Control Channels", 3GPP Draft; R1-145079 Physical Data Channels and Associated Physical Control Channels, 3rd Generation Partnership Project (3GPP), Mobile Competence Centre; 650, Route Des Lucioles; F-06921 Sophia-AN, vol. RAN WG1 Nov. 8, 2014 (Nov. 8, 2014), XP050885717, Retrieved from the Internet: URL:http://www.3gpp.org/ftp/tsg_ran/WG1_RL 1/TSGR1_79/ Docs/ [retrieved on Nov. 8, 2014].

* cited by examiner

REFERENCE SIGNAL DESIGN FOR COVERAGE ENHANCEMENTS

CROSS-REFERENCE TO RELATED APPLICATION(S)

The present application for patent claims priority to U.S. Provisional Application No. 62/116,330, filed Feb. 13, 2015, which is assigned to the assignee of the present application and hereby expressly incorporated by reference herein in its entirety.

BACKGROUND

I. Field of the Invention

Certain aspects of the present disclosure generally relate to wireless communications, and more specifically to reference signal design for communications with coverage enhancements and devices with limited communications resources, such as machine type communication(s) (MTC) devices, enhanced or evolved MTC (eMTC) devices, and internet of things (IoT) devices.

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a wireless node. The method generally includes determining a set of additional reference signals to transmit in a bundled transmission, based on a bundle length of the bundled transmission, and transmitting the bundled transmission, reference signals, and the additional reference signals, based on the determination.

Certain aspects of the present disclosure provide a method for wireless communications by a wireless node. The method generally includes determining a bundled transmission comprises a set of additional reference signals, based on a bundle length of the bundled transmission, and receiving the bundled transmission, reference signals, and the additional reference signals, based on the determination.

Certain aspects of the present disclosure provide a method for wireless communications by a wireless node. The method generally includes determining an additional transmit power to apply to one or more reference signals transmitted in a bundled transmission, based on a bundle length of the bundled transmission, and transmitting the bundled transmission and reference signals, based on the determination.

Certain aspects of the present disclosure provide a method for wireless communications by a wireless node. The method generally includes determining an additional transmit power applied to one or more reference signals by another wireless node when transmitted in a bundled transmission, based on a bundle length of the bundled transmission, and processing the bundled transmission and reference signals, based on the determination.

Certain aspects of the present disclosure provide an apparatus for wireless communications. The apparatus generally includes at least one processor configured to determine a set of additional reference signals to transmit in a bundled transmission, based on a bundle length of the bundled transmission, and transmit the bundled transmission, reference signals, and the additional reference signals, based on the determination, and memory coupled to the at least one processor.

Certain aspects of the present disclosure provide an apparatus for wireless communications. The apparatus generally includes at least one processor configured to determine a bundled transmission comprises a set of additional reference signals, based on a bundle length of the bundled transmission, and receive the bundled transmission, reference signals, and the additional reference signals, based on the determination, and memory coupled to the at least one processor.

Certain aspects of the present disclosure provide an apparatus for wireless communications. The apparatus generally includes at least one processor configured to determine an additional transmit power to apply to one or more reference signals transmitted in a bundled transmission, based on a bundle length of the bundled transmission, and transmit the bundled transmission and reference signals, based on the determination, and memory coupled to the at least one processor.

Certain aspects of the present disclosure provide an apparatus for wireless communications. The apparatus generally includes at least one processor configured to determine an additional transmit power applied to one or more reference signals by another wireless node when transmitted in a bundled transmission, based on a bundle length of the bundled transmission; and process the bundled transmission and reference signals, based on the determination, and memory coupled to the at least one processor.

Certain aspects of the present disclosure provide an apparatus for wireless communications. The apparatus generally includes means for determining a set of additional reference signals to transmit in a bundled transmission, based on a bundle length of the bundled transmission, and means for transmitting the bundled transmission, reference signals, and the additional reference signals, based on the determination.

Certain aspects of the present disclosure provide an apparatus for wireless communications. The apparatus generally includes means for determining a bundled transmission comprises a set of additional reference signals, based on a bundle length of the bundled transmission, and means for receiving the bundled transmission, reference signals, and the additional reference signals, based on the determination.

Certain aspects of the present disclosure provide an apparatus for wireless communications. The apparatus generally includes means for determining an additional transmit power to apply to one or more reference signals transmitted in a bundled transmission, based on a bundle length of the bundled transmission, and means for transmitting the bundled transmission and reference signals, based on the determination.

Certain aspects of the present disclosure provide an apparatus for wireless communications. The apparatus generally includes means for determining an additional transmit power applied to one or more reference signals by another wireless node when transmitted in a bundled transmission, based on a bundle length of the bundled transmission, and means for processing the bundled transmission and reference signals, based on the determination.

Certain aspects of the present disclosure provide a computer readable medium for wireless communication. The computer readable medium generally includes code to determine a set of additional reference signals to transmit in a bundled transmission, based on a bundle length of the bundled transmission, and code to transmit the bundled transmission, reference signals, and the additional reference signals, based on the determination Certain aspects of the present disclosure provide a computer readable medium for wireless communication. The computer readable medium generally includes code to determine a bundled transmission comprises a set of additional reference signals, based on a bundle length of the bundled transmission, and code to receive the bundled transmission, reference signals, and the additional reference signals, based on the determination.

Certain aspects of the present disclosure provide a computer readable medium for wireless communication. The computer readable medium generally includes code to determine an additional transmit power to apply to one or more reference signals transmitted in a bundled transmission, based on a bundle length of the bundled transmission, and code to transmit the bundled transmission and reference signals, based on the determination.

Certain aspects of the present disclosure provide a computer readable medium for wireless communication. The computer readable medium generally includes code to determine an additional transmit power applied to one or more reference signals by another wireless node when transmitted in a bundled transmission, based on a bundle length of the bundled transmission, and code to process the bundled transmission and reference signals, based on the determination.

Numerous other aspects are provided including methods, apparatus, systems, computer program products, computer readable media, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
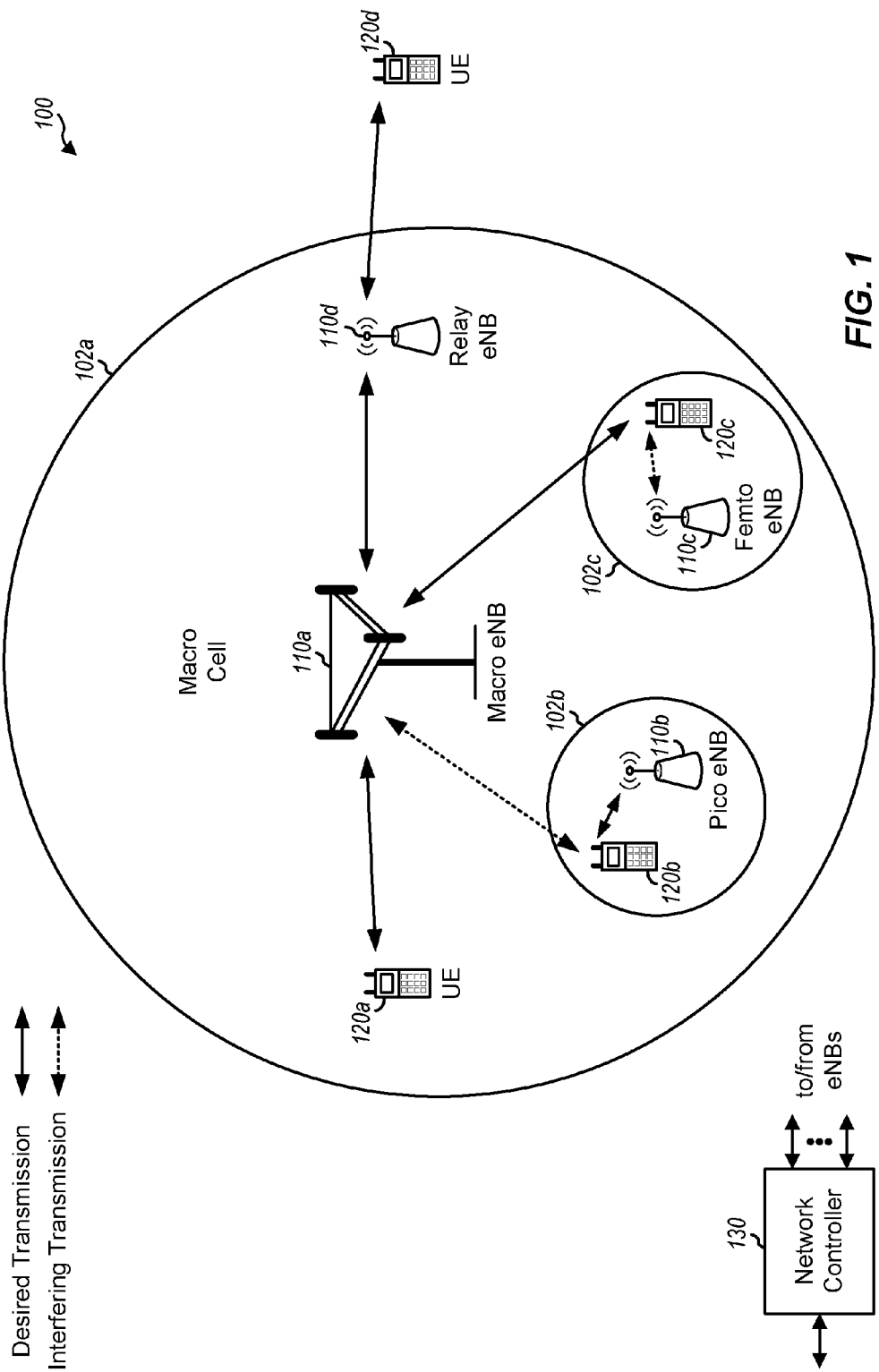
FIG. 1 is a block diagram conceptually illustrating an example wireless communication network, in accordance with certain aspects of the present disclosure.

Aspects of the present disclosure provide techniques and apparatus for enhancing coverage for devices with limited communication resources, such as low cost (LC) machine type communication (MTC) devices, LC enhanced MTC (eMTC) devices, internet of things (IoT) (e.g., narrowband IOT (NB-IoT)) devices, internet of everything (IoE) devices, etc. The aspects include enhancements to reference signals (RS) and techniques for RS transmission. To enhance coverage of certain devices, such as MTC devices, "bundling" may be utilized in which certain transmissions are sent as a bundle of transmissions, for example, with the same information transmitted over multiple subframes. A wireless node may be a wireless device, a UE, a base station (BS), an evolved or enhanced Node B (eNB), a relay, a repeater, a femto cell, a pico cell, etc. For simplicity, MTC, eMTC, IoT, IoE, and the like may be generally referred to as MTC.

For large coverage enhancements with long transmission time interval (TTI) bundling, channel estimation is a bottleneck. That is, estimating channel conditions between the transmitter and receiver may enable higher data transmission rates for transmissions with long TTI bundling. However, a receiver receiving a bundled transmission (e.g., for coverage enhancement) may need to receive and store reference signals from a large portion of the bundled transmission before the receiver is able to estimate the channel conditions and decode the bundled transmission.

According to aspects of the present disclosure, increasing RS density may improve channel estimation and remove the bottleneck, but other issues are encountered when increasing RS density. A first issue is that different bundle lengths may need different RS (e.g., pilot) density, and according to aspects of the present disclosure, techniques are provided for adapting RS density for transmissions of differing bundle lengths. Adapting RS density may include transmitting reference signals in all of the resource elements (REs) in one symbol period, slot, or subframe of a set of transmission resources.

A second issue is that there are many legacy reference signals in wireless communications, such as cell-specific reference signals (CRS), demodulation reference signals (DMRS), and channel state information reference signals (CSI-RS), etc., and an additional (e.g., new) RS should avoid overlapping with the legacy reference signals. Accordingly, designs of reference signals that do not overlap with legacy reference signals are provided, according to aspects of the present disclosure.

A third issue is that low cost devices (e.g., MTC and eMTC devices) should avoid storing all of the data symbols of a received signal, performing channel estimation, and then demodulating the stored data symbols. This type of operation (storing all of the data symbols, performing channel estimation, and then demodulating) may require a large memory for storage of the data symbols, which in turn increases the cost of the device. Accordingly, as will be described in more detail below, the techniques presented herein allow for devices in coverage enhancement conditions to perform channel estimation and demodulation without storing large amounts of data symbols.

A fourth issue is that for some channels, such as enhanced physical downlink control channels (ePDCCHs) and physical uplink control channels (PUCCHs), transmissions for multiple users may be multiplexed within a resource block (RB), and transmission of additional (e.g., new) RS should allow for multiplexing of those channels within the RB. Accordingly, the techniques presented herein enable transmission of additional RS with known modulation symbols in the same resources allocated for multiplexed channels (e.g., ePDCCH and PUCCH), to allow multiplexing the additional RS with the multiplexed channels. For example, additional RS for an ePDCCH may be transmitted within a first subframe of resources (e.g., a bundle) allocated to the ePDCCH. In a second example, additional RS for a PUCCH may be transmitted within a first subframe of resources allocated to the PUCCH.

According to aspects of the present disclosure, increasing transmit power of reference signals in a transmission may remove the channel estimation bottleneck. As will be described in more detail below, techniques presented herein allow devices to apply additional transmit power to reference signals in a bundled transmission. Similarly, techniques presented herein allow devices to receive a bundled transmission, determine an additional transmit power applied to reference signals in the bundled transmission, and process the bundled transmission and reference signals.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

FIG. 1 illustrates an example wireless communication network 100 with base stations (BSs) and user equipments (UEs), in which aspects of the present disclosure may be practiced.

For example, devices in the wireless communication network 100 may communicate using bundled transmissions with increased reference signal density. According to the techniques presented herein, the BSs and LC UE(s) in the wireless communication network 100 may determine a set of additional reference signals to transmit in a bundled transmission and transmit bundled transmissions with the additional reference signals to other BSs and UEs in the wireless communication network 100. Also, according to techniques presented herein, the BSs and/or LC UE(s) in the wireless communication network 100 may determine a bundled transmission comprises additional reference signals and use the additional reference signals in receiving the bundled transmission.

The wireless communication network 100 may be an LTE network or some other wireless network. Wireless communication network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a wireless terminal, a wireless device, a station, a mobile station (MS), a subscriber unit, a station (STA), etc. Examples of UEs may include a cellular phone (e.g., smart phone), a personal digital assistant (PDA), a wireless modem, a wireless communication device, a handheld device, a laptop computer, a cordless phone, a wireless local loop (WLL) station, a tablet, a netbook, a smartbook, an ultrabook, gaming devices, navigation devices, virtual reality devices, wearable devices (e.g., smart glasses/goggles/heads-up displays, smart watch, smart wristband, smart clothing), drones, robots/robotic devices, vehicular devices, medical devices, etc.

One or more UEs 120 in the wireless communication network 100 (e.g., an LTE network) may also be low cost (LC), low data rate devices, e.g., such as low cost MTC UEs, low cost eMTC UEs, low cost narrowband internet of things (NB-IoT) UEs, etc. MTC/eMTC UEs, as well as other types of UEs, may be implemented as internet of things (IoT) or internet of everything (IoE) devices, such as NB-IoT devices. MTC/eMTC/IoT/IoE UEs, for example, include sensors, meters, monitors, location tags, drones, trackers, robots/robotic devices, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, a reduction of peak rate, a reduction of transmit power, restriction to rank 1 transmission, half duplex operation, etc. As used herein, devices with limited communication resources, such as MTC devices, eMTC devices, NB-IoT devices, etc. are referred to generally as LC UEs. Similarly, legacy devices, such as legacy and/or advanced UEs (e.g., in LTE) are referred to generally as non-LC UEs.

Figure 2:
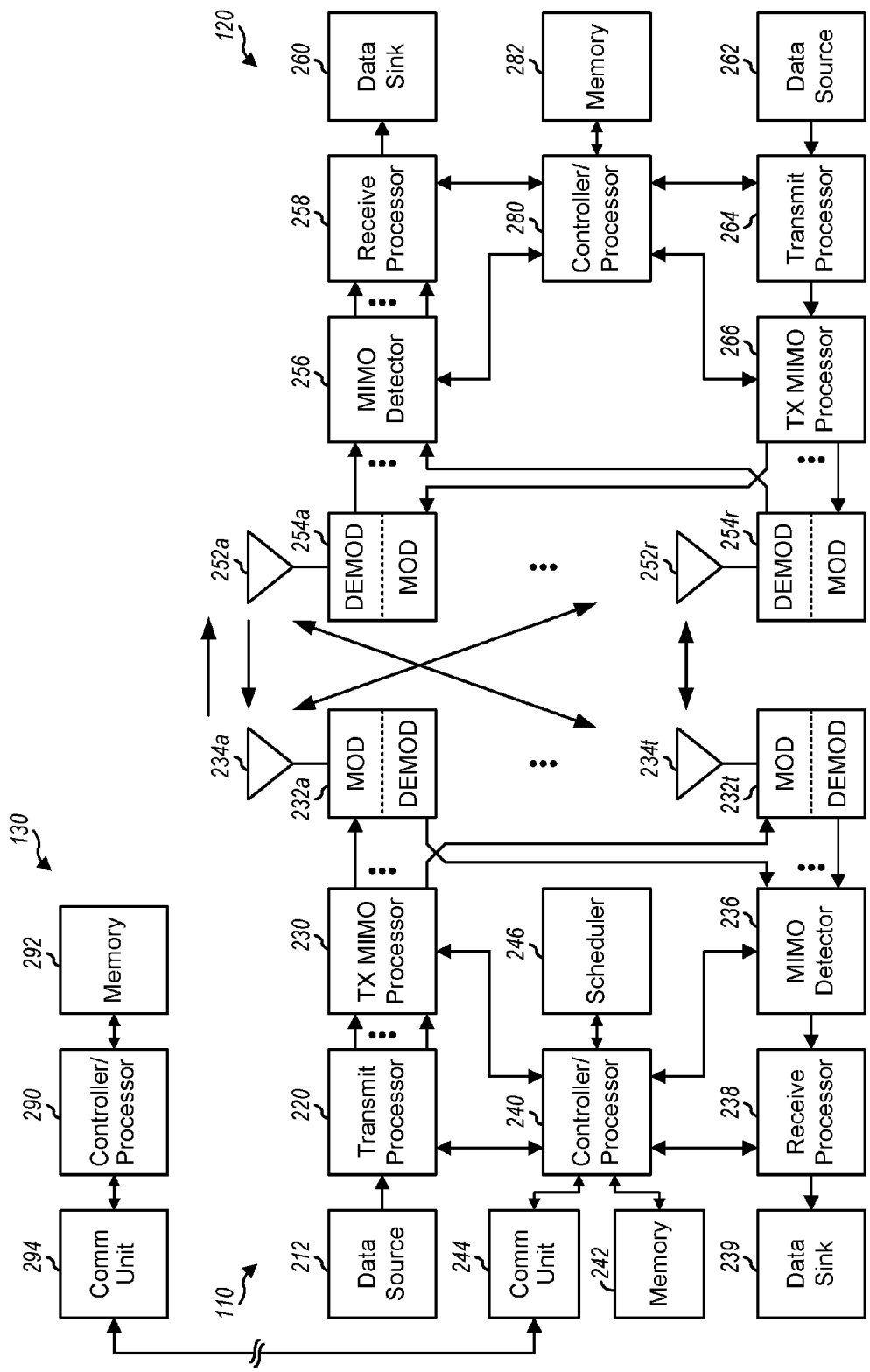
FIG. 2 is a block diagram conceptually illustrating an example of an evolved NodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations 700, 800, 1000, and 1100 illustrated in FIGS. 7, 8, 10, and 11 and/or other processes for the techniques described herein. Similarly, controller/processor 280 and/or other processors and modules at UE 120 may perform or direct operations 700, 800, 1000, and 1100 illustrated in FIGS. 7, 8, 10, and 11 and/or processes for the techniques described herein. Memories 242 and 282 may store data and program codes for BS 110 and UE 120, respectively. A scheduler 246 may schedule UEs for data transmission on the downlink and/or uplink.

Figure 3:
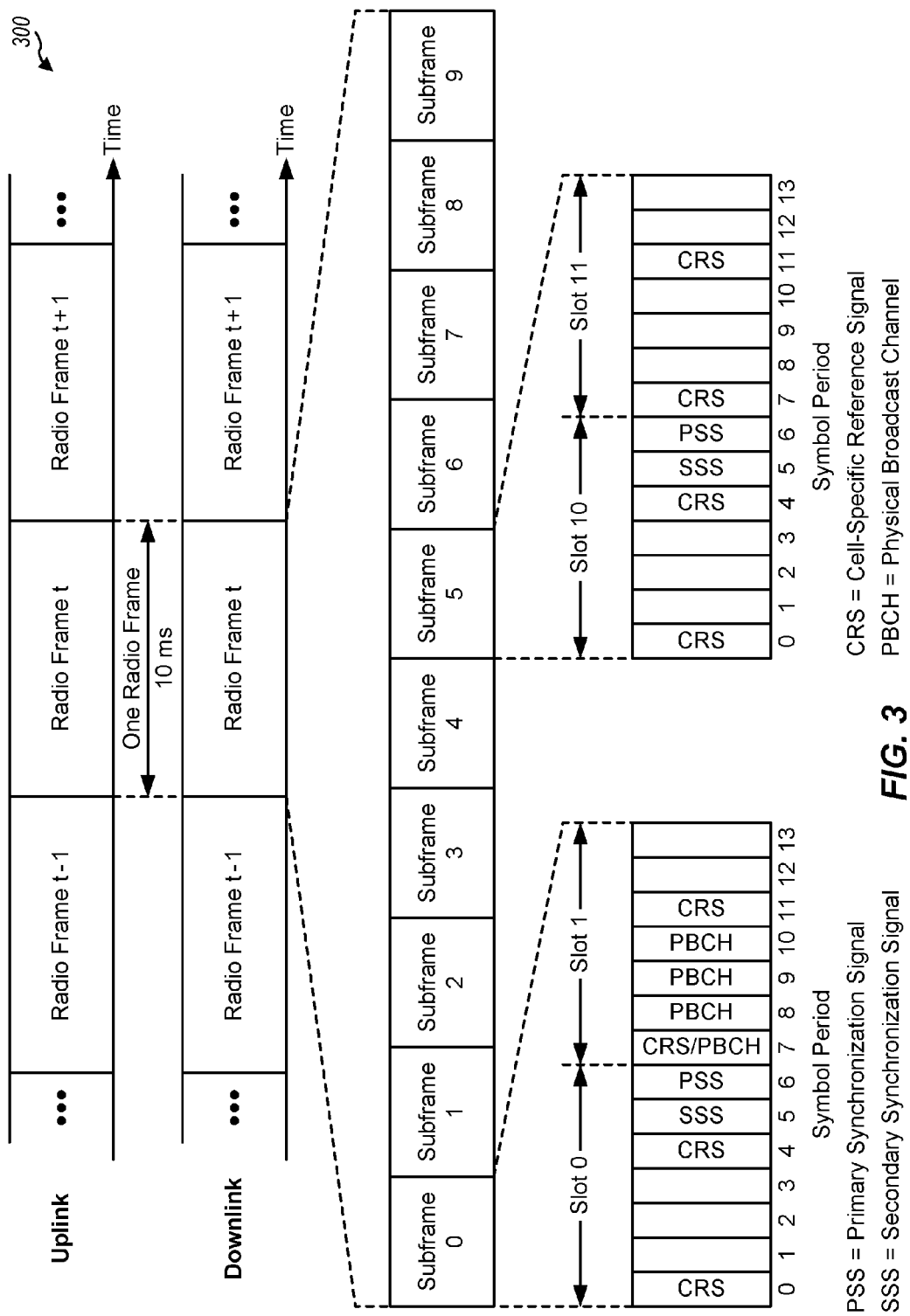
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
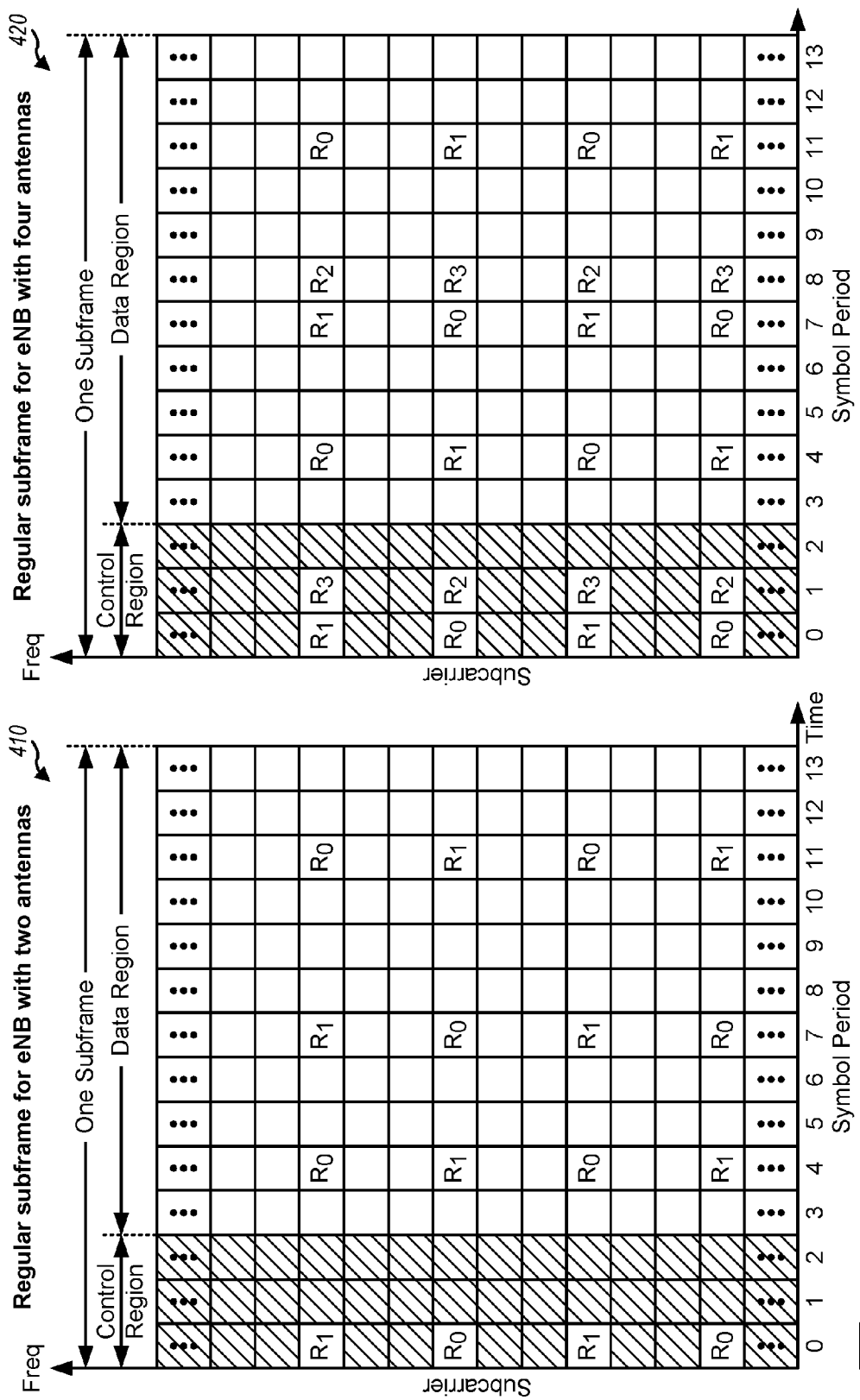
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13, the LC UE may be limited to a particular narrowband assignment (e.g., of no more than six resource blocks (RBs)) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

As mentioned above, coverage enhancements, MTC operation may be supported in a wireless communication network (e.g., in coexistence with LTE or some other RAT) by increasing the density of reference signals (e.g., DMRS) transmitted when communicating. When used with bundled transmissions, the additional RS, which may be referred to as MTC reference signal(s) (MRS), may be transmitted at the beginning of the bundle or in the middle of the bundle and may be transmitted on the downlink or the uplink. Placing the additional RS at the beginning or middle of a bundle may enable a receiving device to perform channel estimation based on the additional RS before receiving the entire associated data transmission. As mentioned above, a device can use less internal memory storing a received signal when the device performs channel estimation without storing the entire received signal.

According to aspects of the present disclosure, additional reference signals (e.g., DMRS) may be transmitted with bundled transmissions. Additional reference signals, which may be referred to as high density reference signals, may be transmitted in some subframes of a bundled transmission. The additional reference signals may be transmitted in resource elements (REs) of a subframe of a transmission that may be used for transmitting data in current (e.g., Rel-12) technologies for bundled transmissions. When a wireless node transmits additional reference signals (e.g., MRS) in a subframe, the subframe may be referred to as an MRS subframe.

According to aspects of the present disclosure, additional reference signals may be transmitted in all of the REs of an MRS subframe that are not used by other signals, such as those illustrated in FIGS. 3 and 4 (e.g., CRS, CSI-RS, PSS, SSS, PBCH).

Figure 5:
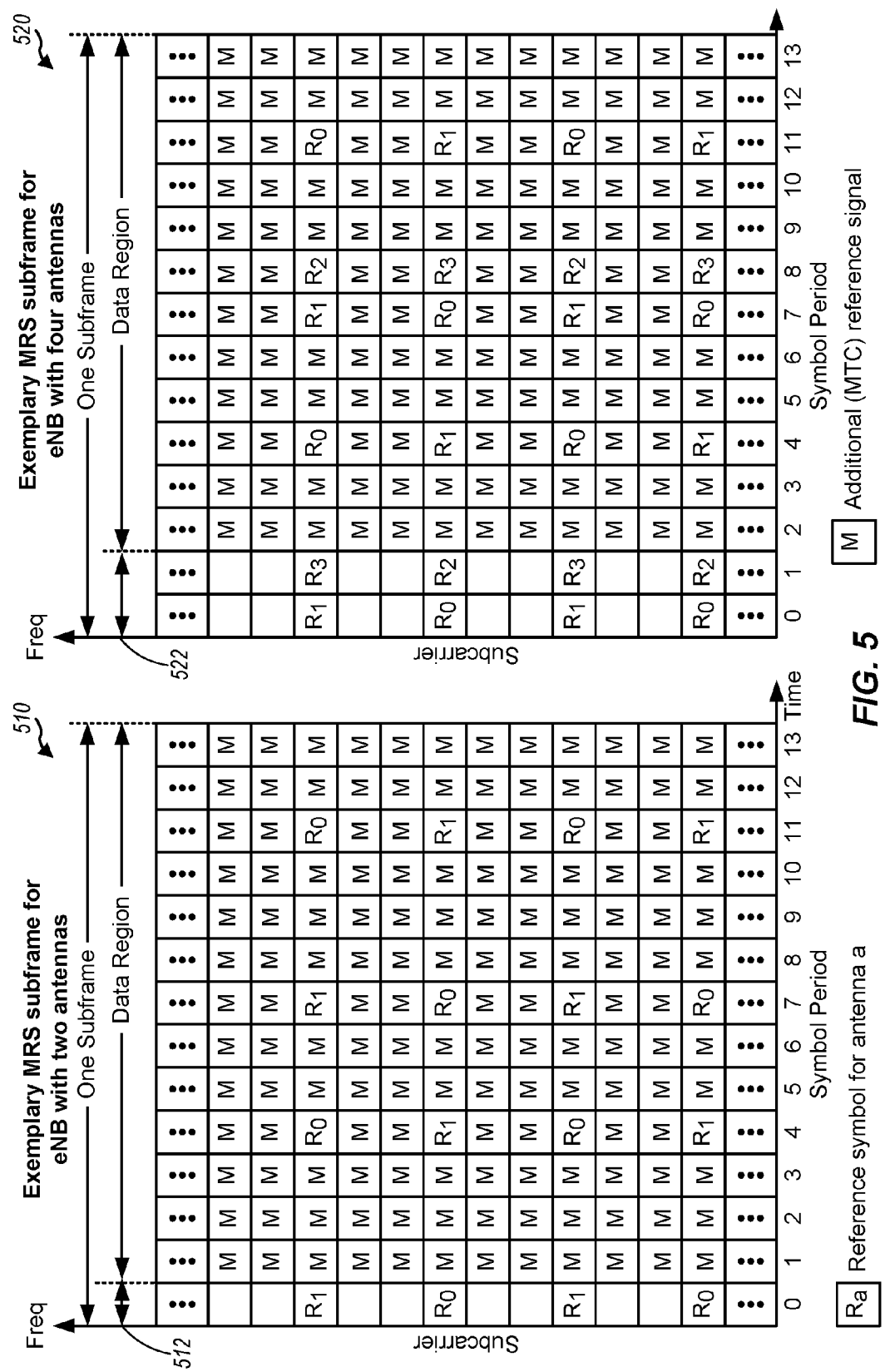
FIG. 5 illustrates two exemplary subframe formats for the downlink wherein additional reference signals are transmitted, in accordance with certain aspects of the present disclosure.

FIG. 5 shows two exemplary subframe formats 510 and 520 for the downlink with a normal cyclic prefix, wherein additional reference signals are transmitted by a base station, according to aspects of the present disclosure. Exemplary subframe format 510 may be used by an eNB equipped with two antennas. Exemplary subframe format 510 has a control region 512 that is one symbol period long, but the disclosure is not so limited and the control region may be, for example, from one to four symbol periods long. REs in the control region that are not used for reference symbols may be used for control channels (e.g., PCFICH, PDCCH). As described above, all of the REs of the exemplary subframe 510 that are not used by other signals are used to transmit additional reference signals.

Exemplary subframe format 520 may be used by an eNB equipped with four antennas. Exemplary subframe format 520 has a control region 522 that is two symbol periods long, but the disclosure is not so limited and the control region may be, for example, from one to four symbol periods long. As with exemplary subframe format 510, REs in the control region 522 that are not used for reference symbols may be used for control channels.

According to aspects of the present disclosure, additional reference signals may be transmitted in all of the REs of a slot of an MRS subframe that are not used by other signals, such as those illustrated in FIGS. 3 and 4. For example, additional reference signals may be transmitted in all of the REs of the first slot (e.g., symbol periods 1-6 of exemplary subframe format 510) of a subframe that are not used by other signals.

According to aspects of the present disclosure, additional reference signals may be transmitted in all of the REs of a symbol period of an MRS subframe that are not used by other signals, such as those illustrated in FIGS. 3 and 4. For example, additional reference signals may be transmitted in all of the REs of a first symbol period (e.g., symbol period 1 of exemplary subframe format 510, symbol period 2 of exemplary subframe format 520) of a subframe that are not used by other signals. In a second example, additional reference signals may be transmitted in all of the REs of a set of consecutive symbol periods (e.g., symbol periods 1-3 of exemplary subframe format 510, symbol periods 2-5 of exemplary subframe format 520) of a subframe that are not used by other signals.

Figure 6B:
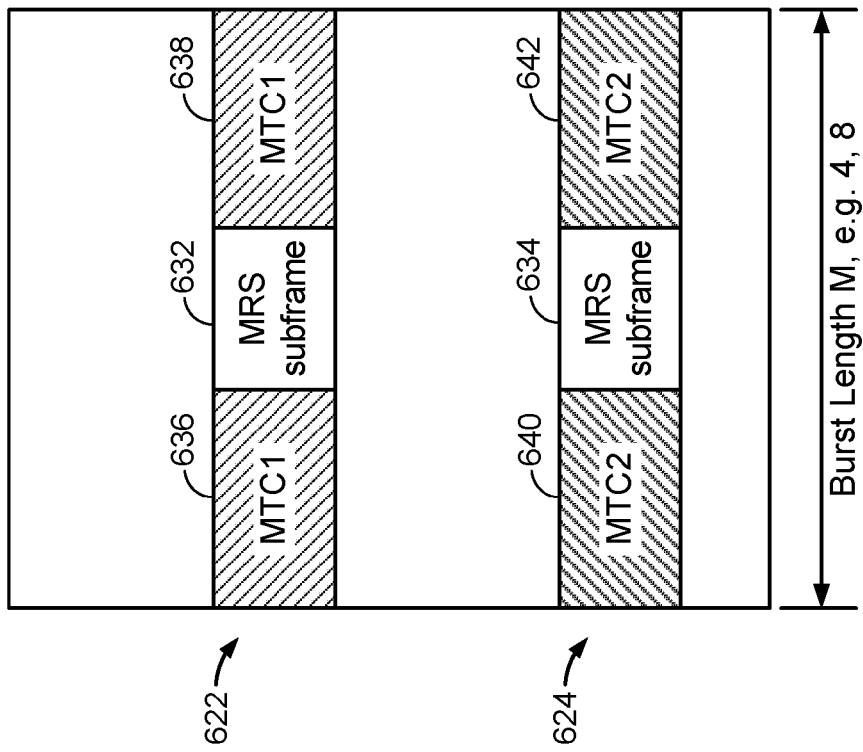
FIGS. 6A and 6B illustrate exemplary bundled transmissions, in accordance with certain aspects of the present disclosure.
Figure 6A:
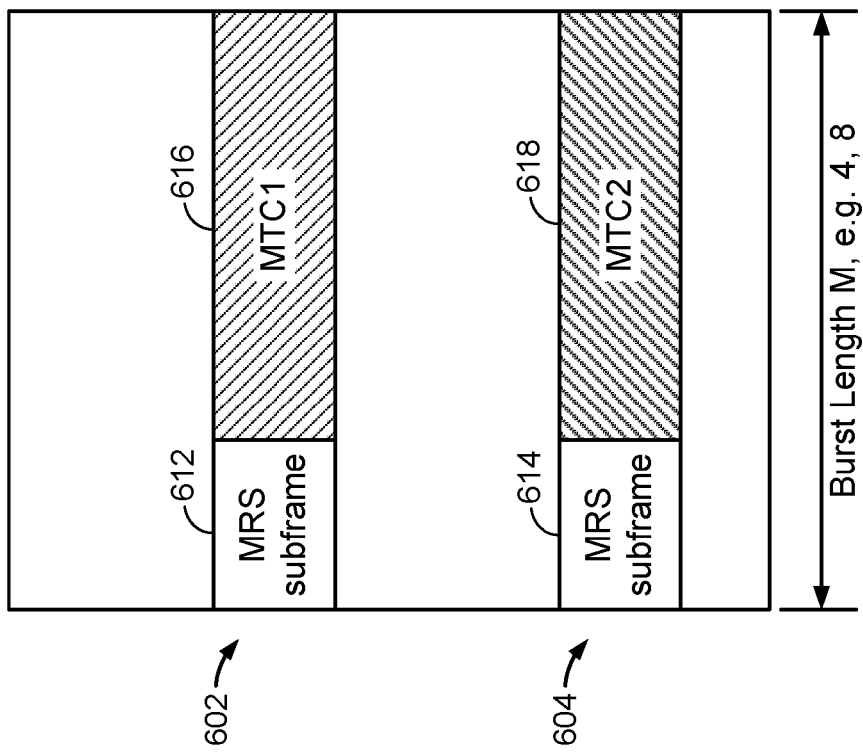

FIGS. 6A and 6B illustrate exemplary bundled transmissions 602, 604, 622, and 624 with additional RS (e.g., MRS). FIG. 6A illustrates exemplary bundled transmissions 602 and 604 with MRS subframes 612 and 614 at the beginning of each bundle. As illustrated, a bundle or burst of length M (e.g., 4, 8, etc.) may be transmitted to an MTC device, and bundles may be transmitted to more than one MTC device (e.g., MTC1, MTC2) during one time period. The MRS may be transmitted in all of the REs of one symbol period of the MRS subframe, all of the REs of one slot of the MRS subframe, or in all REs of the MRS subframe, as mentioned above with reference to FIG. 5. Placing the additional RS within a single subframe may reduce the impact on communications specifications (e.g., Rel-13), in that defining an all RS symbol, slot, or subframe may be simpler than adding RS to a data transmission. The remaining portions 616 and 618 of each bundle may convey data for the indicated MTC device.

FIG. 6B illustrates exemplary bundled transmissions 622 and 624 with MRS subframes 632 and 634 in the middle of each bundle. As illustrated, a bundle or burst of length M (e.g., 4, 8, etc.) may be transmitted to an MTC device, and bundles may be transmitted to more than one MTC device (e.g., MTC1, MTC2) during one time period. The MRS may be transmitted in all of the REs of one symbol period of the MRS subframe, all of the REs of one slot of the MRS subframe, or in all REs of the MRS subframe, for example. The remaining portions 636, 638, 640, and 642 of each bundle may convey data for the indicated MTC device.

As illustrated in the example frame structures of FIGS. 6A and 6B, one or more narrowbands used for MTC may be frequency division multiplexed within the wider bandwidth supported by LTE. Multiple narrowband regions may be supported for MTC and/or eMTC operation. In some cases, each UE in MTC operation may operate within one narrowband region (e.g., 1.4 MHz or 6 RBs) at a time. However, UEs in MTC operation, at any given time, may re-tune to other narrowband regions in the wider system bandwidth. In some examples, multiple UEs may be served by the same narrowband region. In other examples, multiple UEs may be served by different narrowband regions (e.g., with each narrowband region spanning 6 RBs). In yet other examples, different combinations of UEs may be served by one or more same narrowband regions and/or one or more different narrowband regions.

While FIGS. 6A and 6B illustrate transmitting MRS subframes in the beginning or middle of each bundle, the disclosure is not so limited. According to aspects of the present disclosure, MRS may be transmitted in the beginning of a bundle, in the middle of a bundle, in the beginning and middle of a bundle, and in the beginning of each segment or burst of a bundle, where different bursts can hop in frequency.

In the frequency domain, MRS may be transmitted in the same frequencies as the subsequent transmission. For example, if a bundled PUSCH is scheduled in 6 RBs, then MRS for that bundled PUSCH may be transmitted in the first subframe (e.g., an MRS subframe) of the bundle in the same frequencies as the scheduled 6 RBs. In a second example, if a bundled PUCCH is scheduled in 1 RB, then MRS for that bundled PUCCH may be transmitted in the first subframe of the bundle in the same frequencies as the scheduled 1 RB. This may be because MRS transmitted on frequencies other than the frequencies of the scheduled transmissions may not be received with the same channel conditions as the scheduled transmissions. Additionally, as mentioned above, transmitting MRS on the same frequencies as the subsequent transmission allows for multiplexing with a multiplexed channel.

According to aspects of the present disclosure, when MRS are multiplexed in an RB with signaling of another channel (e.g., an ePDCCH or PUCCH), the MRS may be transmitted with known modulation symbols with the same transmission resources allocated to the other channel (as described above) in the RB, while other RBs (e.g., other RBs in a bundled transmission) allocated to the channel are used for transmitting the channel. Transmitting the MRS with known modulation symbols allows other nodes receiving the multiplexed signals to decode the other channels.

As mentioned above, transmissions of different bundle lengths may need different RS (e.g., MRS) density. According to aspects of the present disclosure, dimension loss due to transmitting one MRS subframe in short bundles (e.g., four or eight subframe bundles) may result in increased block error rate (BLER) and overall decreased data throughput in the bundled transmission. According to aspects of the present disclosure, transmission of MRS may be dependent on a bundle size of a transmission. According to these aspects, when a small (e.g., eight subframes or smaller) bundle transmission is to be transmitted, no MRS should be transmitted. Also according to these aspects, when a medium (e.g., more than eight subframes and less than 128 subframes) bundle transmission is to be transmitted, one or more (e.g., two) MRS subframes should be transmitted with each bundle. And, according to these aspects, when a large (e.g. more than 128 subframes) bundle transmission is to be transmitted still more (e.g. four) MRS should be transmitted with each bundle.

Figure 7:
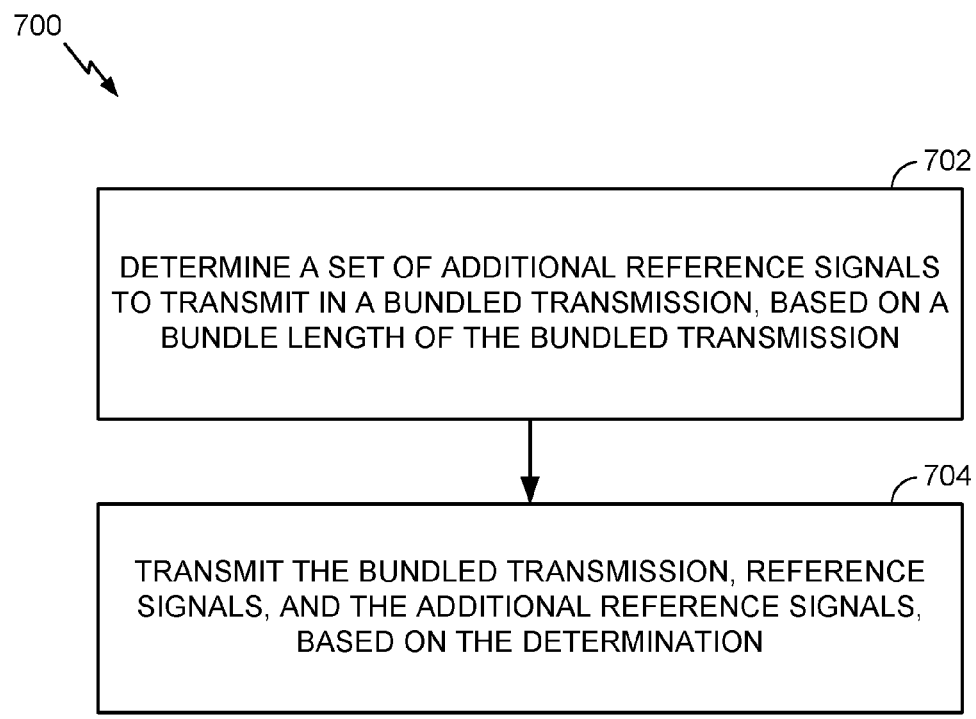
FIG. 7 illustrates an exemplary operation for wireless communications performed by a wireless node, in accordance with certain aspects of the present disclosure.

FIG. 7 illustrates an exemplary operation 700 for wireless communications that may be performed by a wireless node, according to aspects of the present disclosure.

Operation 700 begins at block 702, wherein the wireless node determines a set of additional reference signals to transmit in a bundled transmission, based on a bundle length of the bundled transmission. For example, the wireless node may be scheduled to transmit a bundled transmission in six RBs over a bundle length of sixteen subframes, and the wireless node may determine to transmit additional reference signals (e.g., MRS) in the six RBs in the first subframe of the sixteen subframes.

At block 704, operation 700 continues by the wireless node transmitting the bundled transmission, reference signals, and the additional reference signals, based on the determination. In the example, the wireless node transmits additional reference signals (e.g., MRS) in the six RBs in the first subframe of the sixteen subframes, and transmits the data of the bundled transmission and reference signals in the six RBs in the remaining fifteen subframes of the bundled transmission.

Figure 8:
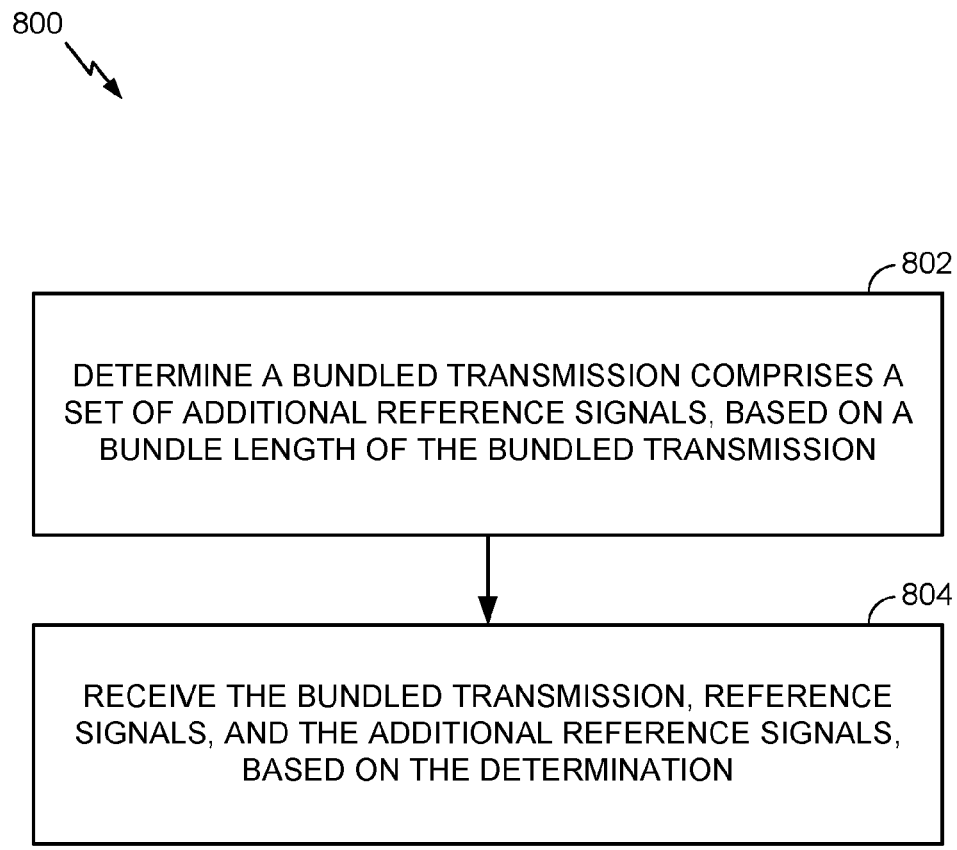
FIG. 8 illustrates an exemplary operation for wireless communications performed by a wireless node, in accordance with certain aspects of the present disclosure.

FIG. 8 illustrates an exemplary operation 800 for wireless communications that may be performed by a wireless node, according to aspects of the present disclosure.

Operation 800 begins at block 802, wherein the wireless node determines a bundled transmission comprises a set of additional reference signals, based on a bundle length of the bundled transmission. For example, the wireless node may be scheduled to receive a bundled transmission in six RBs over a bundle length of sixteen subframes, and the wireless node may determine that additional reference signals (e.g., MRS) are present in the six RBs in the first subframe of the sixteen subframes.

At block 804, operation 800 continues by the wireless node receiving the bundled transmission, reference signals, and the additional reference signals, based on the determination. In the example, the wireless node receives the additional reference signals (e.g., MRS) in the six RBs in the first subframe of the sixteen subframes, estimates the channel based on the additional reference signals, and demodulates the signals received in the six RBs in the remaining fifteen subframes of the bundled transmission to extract the data of the bundled transmission.

According to aspects of the present disclosure, an amount of the additional reference signals for a bundled transmission may be based on a bundle length of the bundled transmission. For example, bundle sizes for bundled transmissions may be defined (e.g., in a network specification) with a corresponding MRS configuration. In the example, a bundle size of sixteen TTIs may correspond (in the network specification) to a first symbol within the sixteen TTIs being used for MRS. In the example, a frequency hopping bundle with a burst eight subframes on a first frequency and a burst of eight subframes on a second frequency may correspond to a first subframe in each burst of eight subframes being an MRS subframe.

According to aspects of the present disclosure, a bundled transmission may comprise bursts of subframes transmitted in different frequencies, and additional reference signals are transmitted in a same subframe of each burst. For example, a bundled transmission may include two bursts of eight subframes each transmitted on two different frequencies, and additional reference signals in the example are transmitted in the first subframe of each of the two bursts of eight subframes.

According to aspects of the present disclosure, a wireless node may transmit additional reference signals in a same slot of each of one or more subframes. For example, a wireless node transmitting a bundled transmission 128 subframes in length may transmit additional reference signals (e.g., MRS) in the second slot of each of the first, thirty-third, sixty-fifth, and ninety-seventh subframes.

According to aspects of the present disclosure, a wireless node may transmit additional reference signals in resource elements that are not used to transmit or receive other types of signals. For example, an eNB transmitting MRS on downlink in an RB may transmit a physical control format indicator channel (PCFICH) in an RB indicating that the first two symbols of that RB are for control signaling (e.g., PCFICH, PDCCH, etc.) and the remaining twelve symbols are for PDSCH, and then transmit a known MRS sequence in the twelve symbols indicated for use for a PDSCH. In a second example, a wireless node transmitting MRS in an RB may transmit the MRS in REs that are not used for transmitting CRS, CSI-RS, PSS, SSS, PBCH, or DMRS.

According to aspects of the present disclosure, a wireless node may determine a bandwidth of additional reference signals based on a bandwidth of a bundled transmission. For example, a wireless node may be scheduled to transmit a bundled transmission on one RB (e.g., twelve subcarriers in LTE), and the wireless node may determine to transmit additional reference signals (e.g., MRS) on a bandwidth of one RB.

According to aspects of the present disclosure, a wireless node may transmit additional reference signals multiplexed with other signaling (e.g., PUCCH, PDCCH, ePDCCH).

According to aspects of the present disclosure, a wireless node may determine an amount of additional reference signals to transmit with a bundled transmission based on a mobility characteristic (e.g., speed, Doppler shift) of a UE. The wireless node may determine to transmit additional reference signals at the beginning and in the middle of each burst of a transmission. Additional reference signals in the middle of a burst may allow a receiving wireless node to update a channel estimate being used in receiving the bundled transmission. The updated channel estimate may allow the receiving wireless node to track short term changes in the channel, particularly changes in phase or frequency, caused by mobility of a wireless node (e.g., a UE).

According to aspects of the present disclosure, a wireless node may transmit an indication of a mobility characteristic of the wireless node to another wireless node. For example, a UE may transmit a bit (e.g., in a control channel) during connection setup (e.g., RRC connection setup) with an eNB to indicate if the UE is moving at a high speed or a low speed (e.g., stationary). In the example, the UE may transmit a "1" to indicate the UE is moving at a high speed or a "0" to indicate the UE is moving at a low speed. In the example, the UE is moving at a high speed, and the UE transmits a "1" in the bit. Still in the example, the UE transmits a higher number of MRS (e.g., a higher number of MRS subframes) in the bundled transmission to the eNB than the UE would transmit if the UE was moving at a low speed. Still in the example, the higher number of MRS may be in both the beginning and middle of bursts of the bundled transmission. Still in the example, because the UE transmitted a "1" in the bit, the UE may determine that a bundled transmission received from the eNB includes a higher number of MRS (e.g., a higher number of MRS subframes) in the bundled transmission than the UE would receive if the UE had transmitted a "0" in the bit.

According to aspects of the present disclosure, a wireless node may receive an indication of a mobility characteristic from another wireless node. For example, an eNB may receive a bit (e.g., in a control channel) from a UE during connection setup (e.g., RRC connection setup) to indicate if the UE is moving at a high speed or a low speed (e.g., stationary). In the example, the BS may receive a "1" in the bit and determine the UE is moving at a high speed or receive a "0" in the bit and determine the UE is moving at a low speed. In the example, the eNB receives a "1" in the bit and determines the UE is moving at a high speed. Still in the example, the eNB transmits a higher number of MRS (e.g., a higher number of MRS subframes) in a bundled transmission to the UE than the eNB would transmit if the eNB had determined that the UE was moving at a low speed. Still in the example, the higher number of MRS may be in both the beginning and middle of bursts of the bundled transmission. Still in the example, because the eNB determined that the UE was moving at a high speed, the eNB may determine that a bundled transmission received from the UE includes a higher number of MRS (e.g., a higher number of MRS subframes) in the bundled transmission than the eNB would receive if the eNB had determined that the UE was moving at a low speed.

Figure 9:
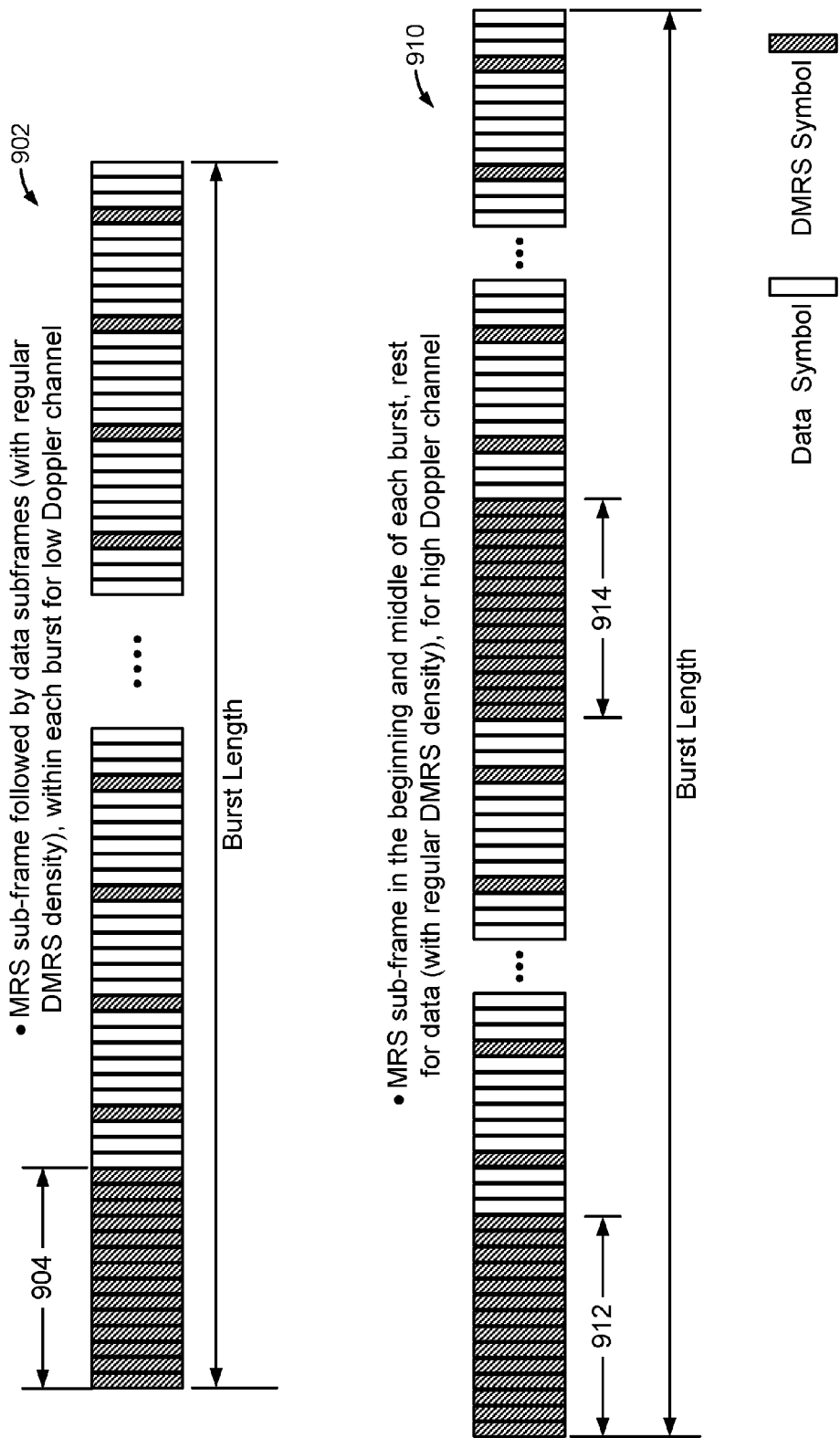
FIG. 9 illustrates exemplary bursts of bundled transmissions, in accordance with certain aspects of the present disclosure.

FIG. 9 illustrates exemplary bursts of bundled transmissions using MRS subframes, according to aspects of the present disclosure. Bundled transmission 902 may be transmitted by a UE moving at a low speed (e.g., including stationary) and thus having a low Doppler shift. As illustrated, burst 902 has an MRS subframe 904 at the beginning of the burst, and data subframes with regular DMRS density in the remainder of the burst.

Burst 910 may be transmitted by a UE moving at a high speed and thus having a high Doppler shift. As illustrated, burst 910 has an MRS subframe 912 at the beginning of the burst and a second MRS subframe 914 in the middle of the burst, and data subframes with regular DMRS density in the remainder of the bundle.

According to aspects of the present disclosure, a wireless node may calculate a channel estimate by combining estimates calculated from MRS subframes and estimates from RS received in other subframes, and in the combination the wireless node may weight the estimates calculated from MRS subframes with coefficients higher than coefficients for the estimates calculated from RS received in other subframes. By using higher coefficients for the estimates calculated from MRS subframes, the wireless node may account for the density boost caused by the larger number of RS in MRS subframes.

According to certain aspects of the present disclosure, wireless node may increase (e.g., boost) the power used for transmission of reference signals in a period of time (e.g., a subframe) as part of a bundled transmission. A receiving wireless node may use the reference signals with increased power to calculate channel estimates, and then use the calculated estimates in receiving data from the remainder of the bundled transmission.

Figure 10:
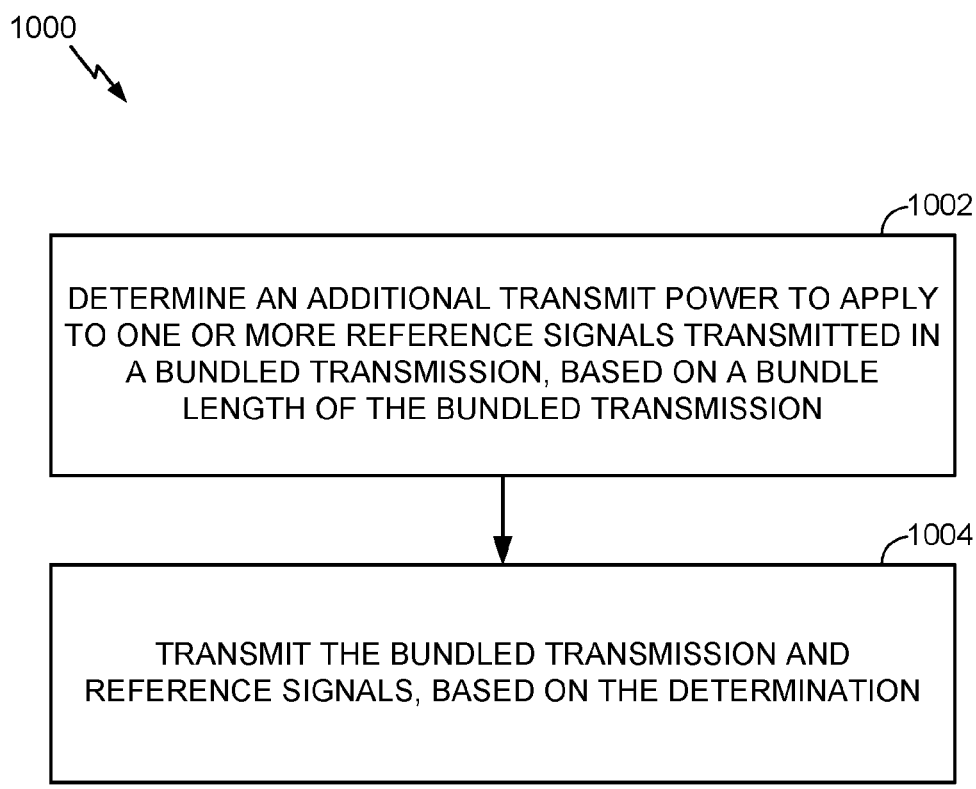
FIG. 10 illustrates an exemplary operation for wireless communications performed by a wireless node, in accordance with certain aspects of the present disclosure.

FIG. 10 illustrates an exemplary operation 1000 for wireless communications that may be performed by a wireless node, according to aspects of the present disclosure.

Operation 1000 begins at block 1002, wherein the wireless node determines an additional transmit power to apply to one or more reference signals transmitted in a bundled transmission, based on a bundle length of the bundled transmission. For example, the wireless node may be scheduled to transmit a bundled transmission in six RBs over a bundle length of sixteen subframes, and the wireless node may determine to transmit reference signals in the first subframe of the sixteen subframes at quadruple (e.g., 4×) the power level used in the other subframes of the sixteen subframes.

At block 1004, operation 1000 continues by the wireless node transmitting the bundled transmission and reference signals, based on the determination. In the example, the wireless node transmits reference signals in the six RBs in the first subframe of the sixteen subframes at quadruple (e.g., 4×) the power level used in the other subframes of the sixteen subframes, and transmits the data of the bundled transmission and reference signals at a standard power level in the six RBs in the remaining fifteen subframes of the bundled transmission.

Figure 11:
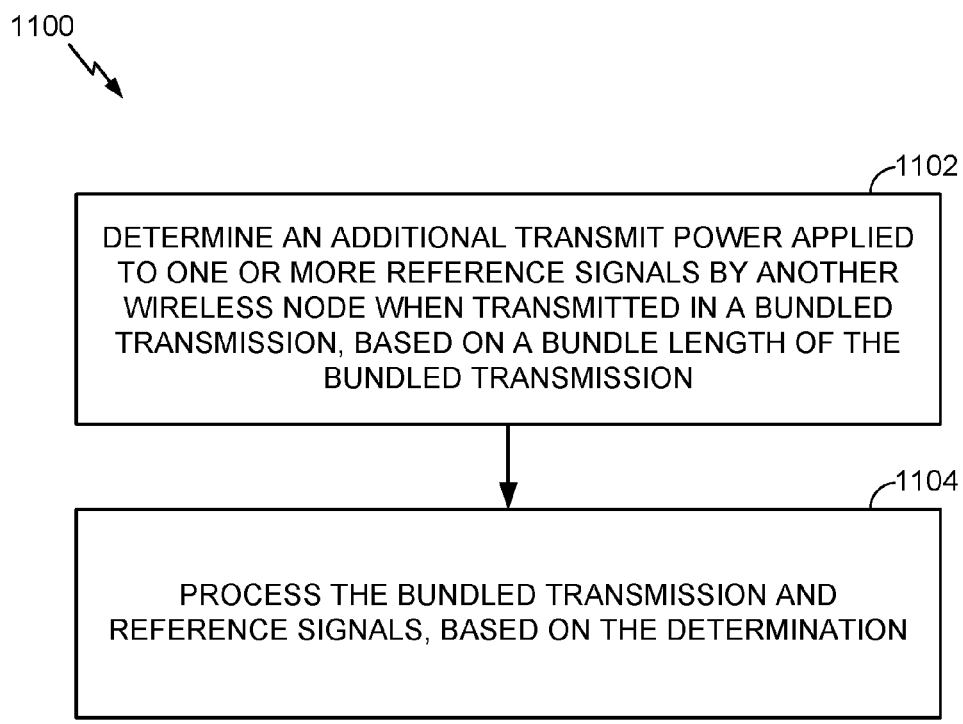
FIG. 11 illustrates an exemplary operation for wireless communications performed by a wireless node, in accordance with certain aspects of the present disclosure.

FIG. 11 illustrates an exemplary operation 1100 for wireless communications that may be performed by a wireless node, according to aspects of the present disclosure.

Operation 1100 begins at block 1102, wherein the wireless node determines an additional transmit power applied to one or more reference signals by another wireless node when transmitted in a bundled transmission, based on a bundle length of the bundled transmission. For example, the wireless node may be scheduled to receive a bundled transmission in six RBs over a bundle length of sixteen subframes, and the wireless node may determine that reference signals present in the six RBs in the first subframe are transmitted at double the power of reference signals in the remaining fifteen subframes of the sixteen subframes.

At block 1104, operation 1100 continues by the wireless node processing the bundled transmission and reference signals, based on the determination. In the example, the wireless node receives the double-power reference signals in the six RBs in the first subframe of the sixteen subframes, estimates the channel based on the double-power reference signals, and demodulates the signals received in the six RBs in the sixteen subframes of the bundled transmission to extract the data of the bundled transmission.

As mentioned above, according to aspects of the present disclosure, MRS subframes may be used with frequency hopped bundled transmissions. In aspects of the present disclosure, a UE or eNB may transmit a frequency hopped bundled transmission with an MRS subframe in each burst of the bundle. That is, a bundled transmission may be transmitted in multiple bursts that hop across frequency, and an MRS subframe may be included in each burst.

Figure 12:
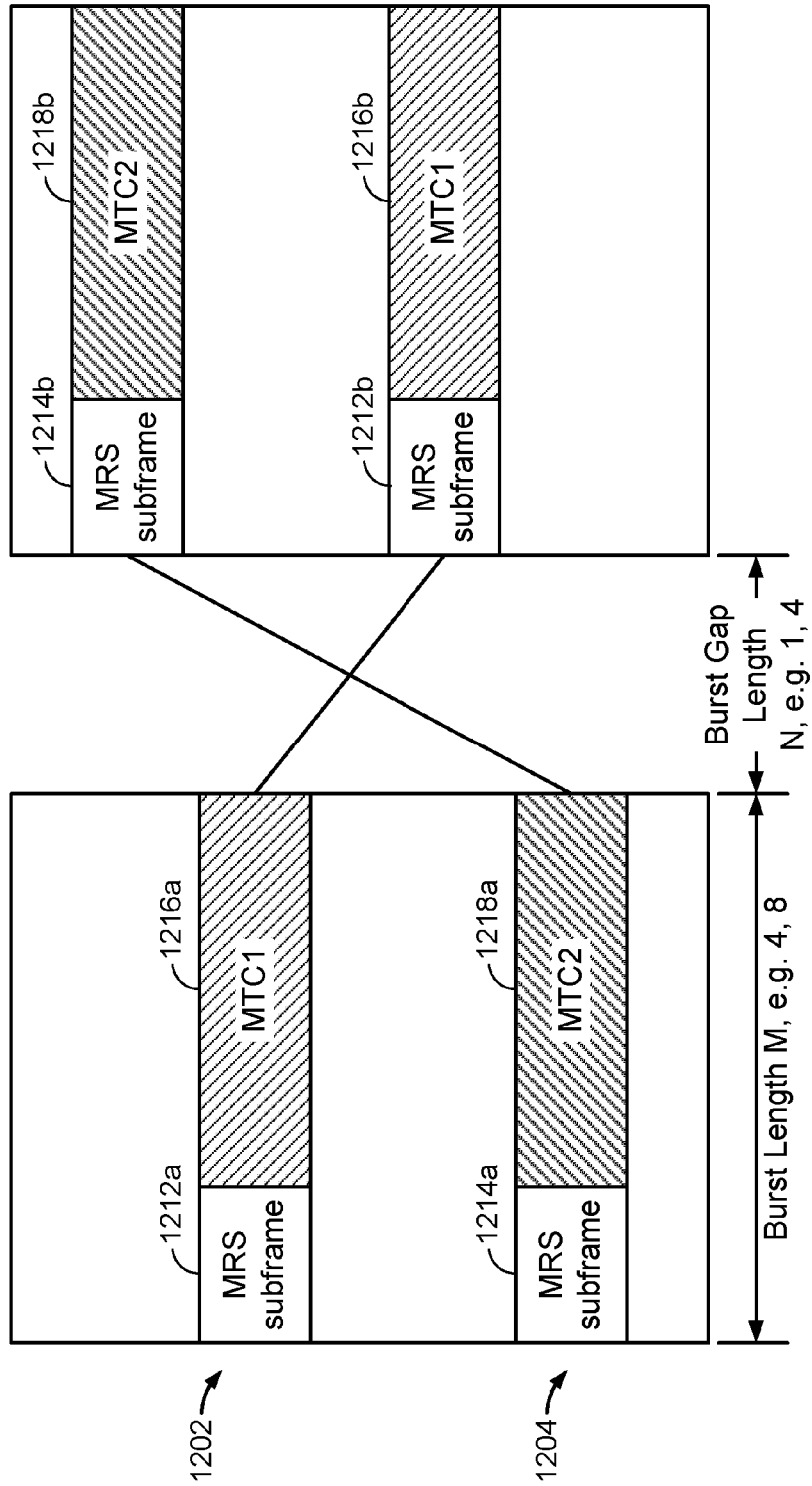
FIG. 12 illustrates exemplary frequency hopped bundled transmissions, in accordance with certain aspects of the present disclosure.

FIG. 12 illustrates exemplary frequency hopped bundled transmissions 1202 and 1204 with MRS subframes. As illustrated, exemplary frequency hopped bundled transmissions 1202 and 1204 are each divided into two bursts of length M with a burst gap of length N, and hop across frequency during the burst gap. Each of transmissions 1202 and 1204 includes an MRS subframe 1212a, 1212b, 1214a, or 1214b at the beginning of each burst.

As illustrated, bundles may be transmitted to more than one MTC device (e.g., MTC1, MTC2) during one time period. The illustrated bundled transmissions do not change by the same frequency increment or in the same direction, but the disclosure is not so limited and also includes bundled transmissions frequency hopping by common amounts and/or in common directions.

Figure 13:
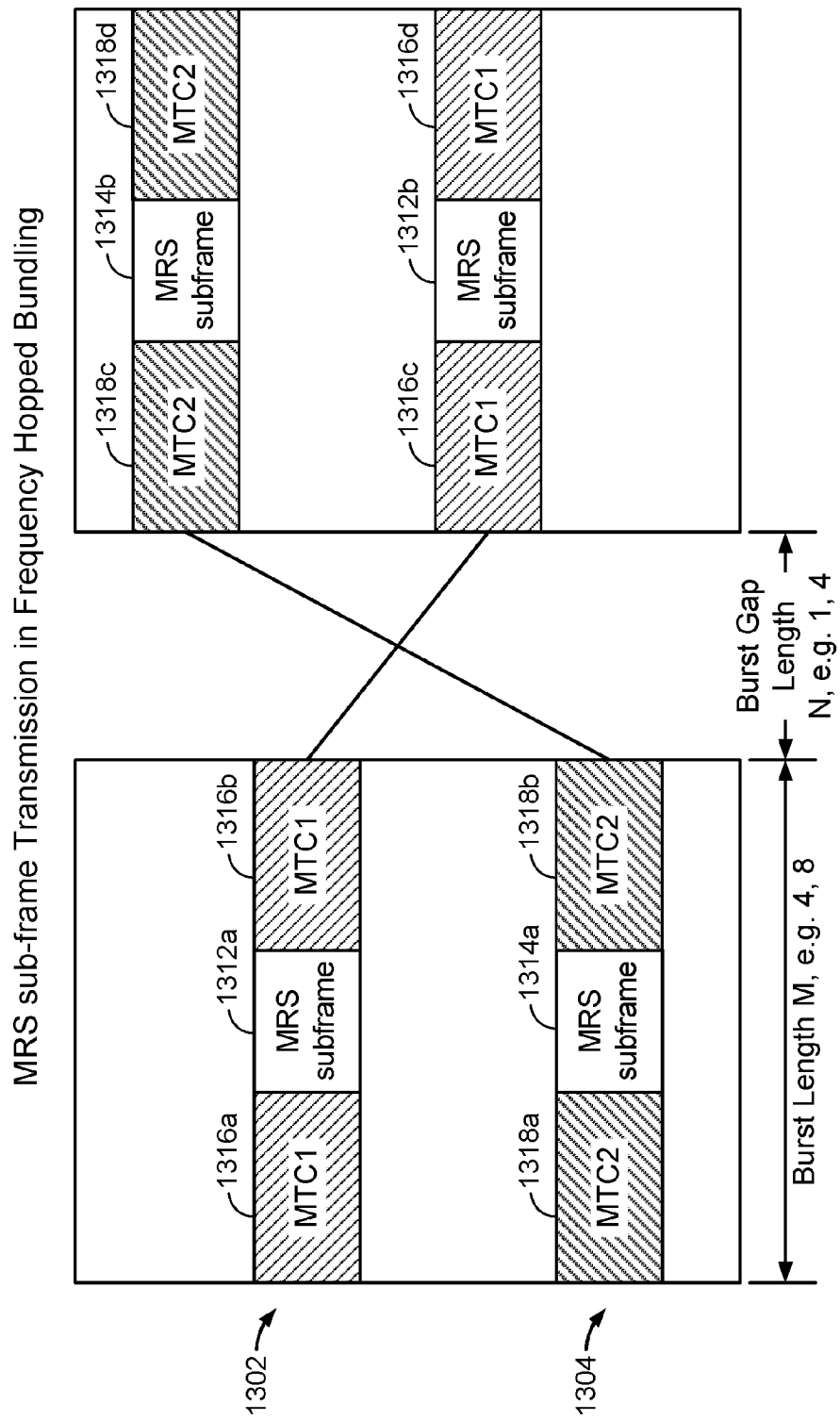
FIG. 13 illustrates exemplary frequency hopped bundled transmissions, in accordance with certain aspects of the present disclosure.

FIG. 13 illustrates exemplary frequency hopped bundled transmissions 1302 and 1304 with MRS subframes. As illustrated, exemplary frequency hopped bundled transmissions 1302 and 1304 are each divided into two bursts of length M with a burst gap of length N, and hop across frequency during the burst gap. Each of transmissions 1302 and 1304 includes an MRS subframe 1312a, 1312b, 1314a, or 1314b near the middle of each burst. The transmission 1302 includes data portions 1316a, 1316b, 1316c, and 1316d. Similarly, the transmission 1304 includes data portions 1318a, 1318b, 1318c, and 1318d.

As illustrated, bundles may be transmitted to more than one MTC device (e.g., MTC1, MTC2) during one time period. The illustrated bundled transmissions do not change by the same frequency increment or in the same direction, but the disclosure is not so limited and also includes bundled transmissions frequency hopping by common amounts and/or in common directions.

The various techniques described above may be combined in order to determine a bundling size for the bundled paging message and/or to determine when the determination of the bundling size is triggered. For example, in one case, the BS may receive a measurement report with one or more measurements made by the LC UE while the LC UE is in RRC Connected mode and/or an early decoding indication from the LC UE based on early decoding of a bundled broadcast transmission by the BS. In another case, the determination of the bundling size may be triggered periodically by the LC UE and/or every time the LC UE selects or reselects a new cell. In general, however, those of ordinary skill in the art will appreciate that other similar techniques described herein may also be combined in order to enhance the paging procedures for LC UEs.

Further, the various techniques described herein may be used to enhance paging procedures for MTC, and those of ordinary skill in the art will appreciate that the techniques presented herein may also be applied to other procedures in MTC, such as random access procedures, transmission/reception of system information, etc.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The steps of a method or algorithm described in connection with the disclosure herein may be embodied directly in hardware, in a software module executed by a processor, or in a combination of the two. Software shall be construed broadly to mean instructions, data, code, or any combination thereof, whether referred to as software, firmware, middleware, code, microcode, hardware description language, machine language, or otherwise. A software module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering. For example, means for determining or processing may include one or more processors, such as the receive processor 258, the controller/processor 280, transmit processor 264 and/or other processors and modules of the user terminal 120 illustrated in FIG. 2. Means for receiving may include a receive processor (e.g., the receive processor 258) and/or an antenna(s) 252 of the user terminal 120 illustrated in FIG. 2. Means for transmitting may comprise a transmit processor (e.g., the transmit processor 220) and/or an antenna(s) 234 of the eNB 110 illustrated in FIG. 2. Means for indicating may include one or more processors, such as the transmit processor 220, the controller/processor 240 and/or other processors and modules of the eNB 110 illustrated in FIG. 2.

In one or more exemplary designs, the functions described may be implemented in hardware, software or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a wireless node, comprising:
    determining a set of additional reference signal subframes in which to transmit additional reference signals in a bundled transmission, based on a bundle length of the bundled transmission; and transmitting the additional reference signals in the additional reference signal subframes and data in data subframes in the bundled transmission, based on the determination.

2. The method of claim 1, wherein an amount of the additional reference signal subframes is based on the bundle length.

3. The method of claim 1, wherein:
the bundled transmission comprises the additional reference signals and the data transmitted in bursts of subframes, wherein the additional reference signals and the data within each burst are transmitted on a same frequency and the additional reference signals and the data in different bursts are transmitted in different frequencies; and
each of the additional reference signal subframes is a same subframe of each burst.

4. The method of claim 1, wherein the additional reference signals are transmitted in a same slot of each of the additional reference signal subframes.

5. The method of claim 1, wherein the additional reference signals are transmitted in a same symbol of each of the additional reference signal subframes.

6. The method of claim 1, wherein the additional reference signals are transmitted in resource elements of the additional reference signal subframes that are not used to transmit or receive other types of signals.

7. The method of claim 6, wherein the other types of signals comprise at least one of: cell-specific reference signals (CRS), channel state information reference signals (CSI-RS), primary synchronization signals (PSS), secondary synchronization signals (SSS), a physical broadcast channel (PBCH), or demodulation reference signals (DMRS).

8. The method of claim 1, wherein a bandwidth of the additional reference signals is determined based on a bandwidth of the bundled transmission.

9. The method of claim 1, further comprising transmitting other signaling in the data subframes of the bundled transmission.

10. The method of claim 9, wherein the other signaling comprises a physical uplink control channel (PUCCH).

11. The method of claim 9, wherein the other signaling comprises a physical downlink control channel (PDCCH).

12. The method of claim 1, wherein an amount of the additional reference signal subframes is based on a mobility characteristic of a user equipment (UE).

13. The method of claim 12, wherein:
the wireless node is the UE; and
the method further comprises transmitting an indication of the mobility characteristic.

14. The method of claim 12, wherein:
the wireless node is a base station (BS); and
the method further comprises receiving an indication of the mobility characteristic from the UE.

15. A method for wireless communication by a wireless node, comprising:
determining a bundled transmission comprises a set of additional reference signal subframes in which additional reference signals are transmitted, based on a bundle length of the bundled transmission; and
receiving the additional reference signals in the additional reference signal subframes and data in data subframes in the bundled transmission, based on the determination.

16. The method of claim 15, wherein an amount of the additional reference signal subframes is based on the bundle length.

17. The method of claim 15, wherein:
the bundled transmission comprises the additional reference signals and the data transmitted in bursts of subframes, wherein the additional reference signals and the data within each burst are transmitted on a same frequency and the additional reference signals and the data in different bursts are transmitted in different frequencies; and
each of the additional reference signal subframes is a same subframe of each burst.

18. The method of claim 15, wherein the additional reference signals are received in a same slot of each of the additional reference signal subframes.

19. The method of claim 15, wherein the additional reference signals are received in a same symbol of each of the additional reference signal subframes.

20. The method of claim 15, wherein the additional reference signals are received in resource elements of the additional reference signal subframes that are not used to transmit or receive other types of signals.

21. The method of claim 20, wherein the other types of signals comprise at least one of: cell-specific reference signals (CRS), channel state information reference signals (CSI-RS), primary synchronization signals (PSS), secondary synchronization signals (SSS), a physical broadcast channel (PBCH), or demodulation reference signals (DMRS).

22. The method of claim 15, wherein a bandwidth of the additional reference signals is determined based on a bandwidth of the bundled transmission.

23. The method of claim 15, further comprising receiving other signaling in the data subframes of the bundled transmission.

24. The method of claim 23, wherein the other signaling comprises a physical uplink control channel (PUCCH).

25. The method of claim 23, wherein the other signaling comprises a physical downlink control channel (PDCCH).

26. The method of claim 15, wherein an amount of the additional reference signal subframes is based on a mobility characteristic of a user equipment (UE).

27. The method of claim 26, wherein:
the wireless node is the UE; and
the method further comprises transmitting an indication of the mobility characteristic.

28. The method of claim 26, wherein:
the wireless node is a base station (BS); and
the method further comprises receiving an indication of the mobility characteristic from the UE.

29. A method for wireless communications by a wireless node, comprising:
determining an additional transmit power to apply to one or more reference signals transmitted in a bundled transmission, based on a bundle length of the bundled transmission; and
transmitting the bundled transmission and reference signals, based on the determination.

30. A method for wireless communications by a wireless node, comprising:
determining an additional transmit power applied to one or more reference signals by another wireless node when transmitted in a bundled transmission, based on a bundle length of the bundled transmission; and
processing the bundled transmission and reference signals, based on the determination.

31. An apparatus for wireless communications, comprising:
- at least one processor configured to:
  - determine a set of additional reference signal subframes in which to transmit additional reference signals in a bundled transmission, based on a bundle length of the bundled transmission; and
  - transmit the additional reference signals in the additional reference signal subframes and data in data subframes in the bundled transmission, based on the determination; and
- memory coupled to the at least one processor.

32. An apparatus for wireless communication, comprising:
- at least one processor configured to:
  - determine a bundled transmission comprises a set of additional reference signal subframes in which additional reference signals are transmitted, based on a bundle length of the bundled transmission; and
  - receive the additional reference signals in the additional reference signal subframes and data in data subframes in the bundled transmission, based on the determination; and
- memory coupled to the at least one processor.

33. An apparatus for wireless communications, comprising:
- at least one processor configured to:
  - determine an additional transmit power to apply to one or more reference signals transmitted in a bundled transmission, based on a bundle length of the bundled transmission; and
  - transmit the bundled transmission and reference signals, based on the determination; and
- memory coupled to the at least one processor.

34. An apparatus for wireless communications, comprising:
- at least one processor configured to:
  - determine an additional transmit power applied to one or more reference signals by another wireless node when transmitted in a bundled transmission, based on a bundle length of the bundled transmission; and
  - process the bundled transmission and reference signals, based on the determination; and
- memory coupled to the at least one processor.

35. An apparatus for wireless communications, comprising:
- means for determining a set of additional reference signal subframes in which to transmit additional reference signals in a bundled transmission, based on a bundle length of the bundled transmission; and
- means for transmitting the additional reference signals in the additional reference signal subframes and data in data subframes in the transmission, based on the determination.

36. An apparatus for wireless communication, comprising:
- means for determining a bundled transmission comprises a set of additional reference signal subframes in which addition reference signals are transmitted, based on a bundle length of the bundled transmission; and
- means for receiving the additional reference signals in the additional reference signal subframes and data in data subframes in the bundled transmission, based on the determination.

37. An apparatus for wireless communications, comprising:
- means for determining an additional transmit power to apply to one or more reference signals transmitted in a bundled transmission, based on a bundle length of the bundled transmission; and
- means for transmitting the bundled transmission and reference signals, based on the determination.

38. An apparatus for wireless communications:
- means for determining an additional transmit power applied to one or more reference signals by another wireless node when transmitted in a bundled transmission, based on a bundle length of the bundled transmission; and
- means for processing the bundled transmission and reference signals, based on the determination.

39. A non-transitory computer readable medium for wireless communications, comprising:
- code to determine a set of additional reference signal subframes in which to transmit additional reference signals in a bundled transmission, based on a bundle length of the bundled transmission; and
- code to transmit the additional reference signals in the additional reference signal subframes and data in data subframes in the bundled transmission, based on the determination.

40. A non-transitory computer readable medium for wireless communication, comprising:
- code to determine a bundled transmission comprises a set of additional reference signal subframes in which addition reference signals are transmitted, based on a bundle length of the bundled transmission; and
- code to receive the additional reference signals in the additional reference signal subframes and data in data subframes in the bundled transmission, based on the determination.

41. A non-transitory computer readable medium for wireless communications, comprising:
- code to determine an additional transmit power to apply to one or more reference signals transmitted in a bundled transmission, based on a bundle length of the bundled transmission; and
- code to transmit the bundled transmission and reference signals, based on the determination.

42. A non-transitory computer readable medium for wireless communications, comprising:
- code to determine an additional transmit power applied to one or more reference signals by another wireless node when transmitted in a bundled transmission, based on a bundle length of the bundled transmission; and
- code to process the bundled transmission and reference signals, based on the determination.

* * * * *